US012100318B2

(12) United States Patent
Hall

(10) Patent No.: US 12,100,318 B2
(45) Date of Patent: Sep. 24, 2024

(54) SYSTEMS AND METHODS FOR SIMULATING AN ELECTRICAL VERTICAL TAKEOFF AND LANDING (eVTOL) AIRCRAFT

(71) Applicant: BETA AIR, LLC, South Burlington, VT (US)

(72) Inventor: Edward Hall, Starksboro, VT (US)

(73) Assignee: BETA AIR LLC, South Burlington, VT (US)

( * ) Notice: Subject to any disclaimer, the term of this patent is extended or adjusted under 35 U.S.C. 154(b) by 0 days.

(21) Appl. No.: 18/137,924

(22) Filed: Apr. 21, 2023

(65) Prior Publication Data
US 2023/0260421 A1 Aug. 17, 2023

Related U.S. Application Data

(63) Continuation of application No. 17/524,355, filed on Nov. 11, 2021, now Pat. No. 11,694,569.

(51) Int. Cl.
*G09B 9/08* (2006.01)
*G09B 9/20* (2006.01)
*G09B 9/30* (2006.01)

(52) U.S. Cl.
CPC ............ *G09B 9/085* (2013.01); *G09B 9/203* (2013.01); *G09B 9/206* (2013.01); *G09B 9/302* (2013.01)

(58) Field of Classification Search
CPC . G09B 9/08; G09B 9/085; G09B 9/20; G09B 9/203; G09B 9/206; G09B 9/30; G09B 9/302
See application file for complete search history.

(56) References Cited

U.S. PATENT DOCUMENTS

| 5,433,608 | A | 7/1995 | Murray |
| 6,997,715 | B2 | 2/2006 | Perry et al. |
| 8,241,038 | B2 | 8/2012 | Quinn et al. |
| 8,393,901 | B2 | 3/2013 | Bocquet et al. |
| 8,506,301 | B2 | 8/2013 | Jaszlics et al. |
| 8,539,408 | B1 * | 9/2013 | Cheng .................. G06F 30/367 716/110 |
| 8,616,883 | B2 | 12/2013 | Wokurka |

(Continued)

FOREIGN PATENT DOCUMENTS

WO 2020178762 9/2020

OTHER PUBLICATIONS

Gordon, Solutions through simulation, Jun. 21, 2019.

*Primary Examiner* — Timothy A Musselman
(74) *Attorney, Agent, or Firm* — Brake Hughes Bellermann LLP

(57) ABSTRACT

In an aspect of the present disclosure is a system for simulating an electrical vertical takeoff and landing (eVTOL) aircraft, including a fuselage comprising one or more pilot inputs, each of the pilot inputs configured to detect pilot datum; a concave screen facing the fuselage; a plurality of projectors directed at the concave screen; a computing device communicatively connected to the plurality of projectors, the computing device configured to: receive the pilot datum detected by the pilot inputs; generate a simulated eVTOL flight maneuver as a function of the pilot datum; and command the plurality of projectors to display one or more images based on the simulated flight maneuver.

20 Claims, 8 Drawing Sheets

(56) References Cited

U.S. PATENT DOCUMENTS

| | | | |
|---|---|---|---|
| 11,721,235 B2 * | 8/2023 | Skarica | G09B 9/22 |
| | | | 434/48 |
| 2006/0160049 A1 | 7/2006 | Zora | |
| 2008/0206720 A1 | 8/2008 | Nelson | |
| 2016/0049086 A1 | 2/2016 | Mayr | |
| 2017/0025031 A1 | 1/2017 | Dreyer et al. | |
| 2019/0096275 A1 * | 3/2019 | Redkoles | G09B 9/08 |
| 2019/0355272 A1 * | 11/2019 | Nusbaum | G09B 9/42 |
| 2020/0302822 A1 | 9/2020 | Skarica | |
| 2021/0125515 A1 * | 4/2021 | Mikic | G09B 9/24 |
| 2021/0192969 A1 | 6/2021 | de Oliveira Alves, Jr. | |

* cited by examiner

SYSTEMS AND METHODS FOR SIMULATING AN ELECTRICAL VERTICAL TAKEOFF AND LANDING (eVTOL) AIRCRAFT

CROSS-REFERENCE TO RELATED APPLICATIONS

This application is a continuation of Non-provisional application Ser. No. 17/524,355 filed on Nov. 11, 2021, and entitled "SYSTEMS AND METHODS FOR SIMULATING AN ELECTRICAL VERTICAL TAKEOFF AND LANDING (EVTOL) AIRCRAFT," the entirety of which is incorporated herein by reference.

FIELD OF THE DISCLOSURE

The present disclosure generally relates to the field of computer modeling and simulation. In particular, the present disclosure is directed to systems and methods for simulating an electrical vertical takeoff and landing (eVTOL) aircraft.

BACKGROUND

Aircraft simulators may aid in training, maintenance, and testing of aircraft. The functionality of aircraft simulators may be limited by their accuracy of representation for aircraft.

SUMMARY OF THE DISCLOSURE

In an aspect of the present disclosure is a system for simulating an electrical vertical takeoff and landing (eVTOL) aircraft is disclosed. The system includes a fuselage comprising one or more pilot inputs, each of the pilot inputs configured to detect pilot datum. The system includes a screen facing the fuselage. The system includes a plurality of projectors directed at the screen, wherein each of the plurality of projectors is configured to project a distinct image. The system includes a computing device that is communicatively connected to the plurality of projectors. The computing device is configured to receive the pilot datum detected by the pilot inputs. The computing device generates a simulated eVTOL flight maneuver as a function of the pilot datum, wherein generating the simulated eVTOL flight maneuver comprises using an eVTOL aircraft model, including a battery model, to generate the simulated eVTOL flight maneuver. The computing device determines a performance of a user while engaging in the simulated eVTOL flight maneuver. The computing devices then commands the plurality of projectors to display one or more images based on the simulated eVTOL flight maneuver.

In another aspect of the present disclosure, a method for implementing an aircraft simulation system is disclosed. The method includes receiving, at a computing device communicatively connected to a plurality of projectors directed at a screen and from a plurality of pilot inputs installed in a fuselage, a pilot datum, wherein each of the plurality of projectors is configured to project a distinct image. The method also includes generating, by the computing device, a simulated eVTOL flight maneuver as a function of the pilot datum, wherein generating the simulated eVTOL flight maneuver comprises using an eVTOL aircraft model, including a battery model, to generate the simulated eVTOL flight maneuver. The method includes determining, using the computing device, a performance of a user while engaging in the simulated eVTOL flight maneuver. The method includes commanding, by the computing device, the plurality of projectors to display one or more images based on the simulated flight maneuver.

These and other aspects and features of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

For the purpose of illustrating the disclosure, the drawings show aspects of one or more embodiments of the disclosure. However, it should be understood that the present disclosure is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for simulating an electrical vertical takeoff and landing (eVTOL) aircraft. In an embodiment, aspects of the present disclosure are systems and methods to simulate the operation of an eVTOL aircraft in an immersive experience facing a concave screen displaying the simulation environment.

Aspects of the present disclosure can be used to train pilots or users on how to operate an eVTOL aircraft. Aspects of the present disclosure can also be used to train pilots in various flight maneuvers or test features of an eVTOL aircraft. This is so, at least in part, to provide improved training methods and systems in a safe and controlled environment. Exemplary embodiments illustrating aspects of the present disclosure are described below in the context of several specific examples.

For purposes of description herein, the terms "above", "below", "vertical", "horizontal", "forward", "up", "down", and derivatives thereof shall relate to the disclosure as oriented in FIG. 1.

Figure 1:
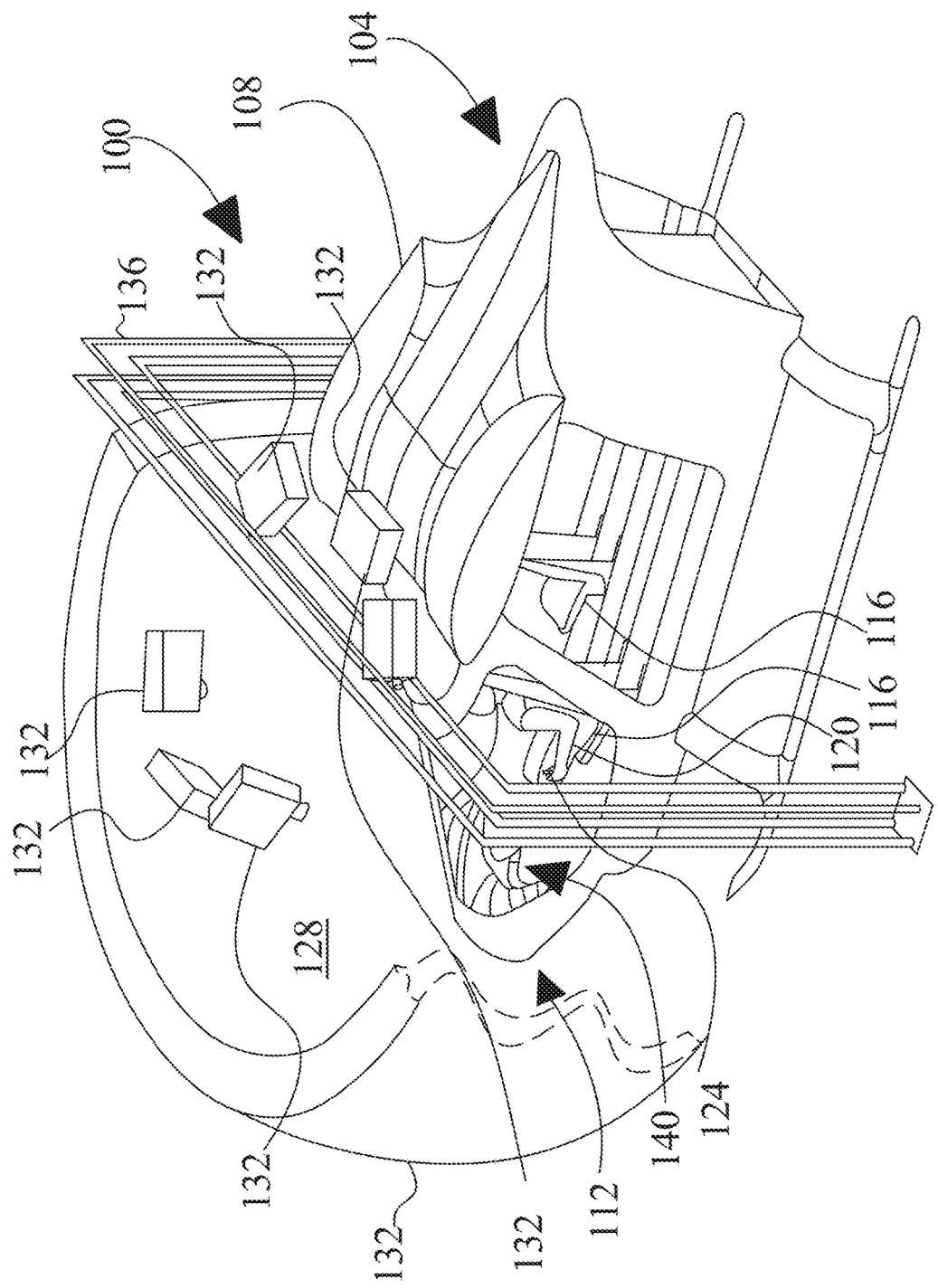
FIG. 1 is an isometric view of a system for simulating an eVTOL aircraft according to an embodiment of the disclosure.

Referring now to FIG. 1, an exemplary embodiment of a system 100 for simulating an electrical vertical takeoff and landing (eVTOL) aircraft is illustrated. System 100 includes a fuselage 104. As used in this disclosure a "fuselage" is a main body of an aircraft and generally contains an aircraft's payload. Fuselage 104 may be a partial or complete replication of an eVTOL aircraft fuselage 104. Fuselage 104 may include structural elements that physically support a shape and structure of an aircraft. Structural elements may take a plurality of forms, alone or in combination with other types. Structural elements may vary depending on a construction type of aircraft such as, without limitation, a fuselage 104. Fuselage 104 may comprise a truss structure. A truss structure may be used with a lightweight aircraft and comprises welded steel tube trusses. A "truss," as used in this disclosure, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later herein.

In embodiments, and with continued reference to FIG. 1, fuselage 104 may include and/or be constructed using geodesic construction. Geodesic structural elements may include stringers wound about formers (which may be alternatively called station frames) in opposing spiral directions. A "stringer," as used in this disclosure, is a general structural element that includes a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of fuselage 104 orthogonal to a longitudinal (nose to tail) axis of the aircraft and may form a general shape of fuselage 104. A former may include differing cross-sectional shapes at differing locations along fuselage 104, as the former is the structural element that informs the overall shape of a fuselage 104 curvature. In embodiments, aircraft skin may be anchored to formers and strings such that the outer mold line of a volume encapsulated by formers and stringers comprises the same shape as fuselage 104 when installed. In other words, former(s) may form a fuselage 104's ribs, and the stringers may form the interstitials between such ribs. The spiral orientation of stringers about formers may provide uniform robustness at any point on fuselage 104 such that if a portion sustains damage, another portion may remain largely unaffected. Aircraft skin may be mechanically coupled to underlying stringers and formers and may interact with a fluid, such as air, to generate lift and perform maneuvers.

In an embodiment, and still referring to FIG. 1, fuselage 104 may include and/or be constructed using monocoque construction. Monocoque construction may include a primary structure that forms a shell (or skin in an aircraft's case) and supports physical loads. Monocoque fuselage 104s are fuselage 104s in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Fuselage 104 may comprise aircraft skin made from plywood layered in varying grain directions, epoxy-impregnated fiberglass, carbon fiber, or any combination thereof.

According to embodiments, and further referring to FIG. 1, fuselage 104 may include a semi-monocoque construction. Semi-monocoque construction, as used herein, is a partial monocoque construction, wherein a monocoque construction is describe above detail. In semi-monocoque construction, fuselage 104 may derive some structural support from stressed aircraft skin and some structural support from underlying frame structure made of structural elements. Formers or station frames may be seen running transverse to the long axis of fuselage 104 with circular cutouts which are generally used in real-world manufacturing for weight savings and for the routing of electrical harnesses and other modern on-board systems. In a semi-monocoque construction, stringers are thin, long strips of material that run parallel to fuselage 104's long axis. Stringers may be mechanically coupled to formers permanently, such as with rivets. Aircraft skin may be mechanically coupled to stringers and formers permanently, such as by rivets as well. A person of ordinary skill in the art will appreciate, upon reviewing the entirety of this disclosure, that there are numerous methods for mechanical fastening of the aforementioned components like screws, nails, dowels, pins, anchors, adhesives like glue or epoxy, or bolts and nuts, to name a few.

Referring to FIG. 1, in fuselage 104 may include a cockpit 112 and one, two, or more pilot seats 116. Pilot seats 116 may include haptics that are configured to provide a tactile sensation to users. Cockpit 112 may be a partial or complete replication of an eVTOL aircraft cockpit. Cockpit 112 may include one or more windows. Fuselage 104 may contain one or more entrances into cockpit 112 for a pilot 120 to enter and exit. Fuselage 104 includes one or more pilot inputs 124, each of the pilot inputs 124 configured to detect pilot datum. As used in this disclosure, a "pilot input" is defined as any gauge, throttle lever, clutch, dial, control, or any other mechanical or electrical device that is configured to be manipulated by pilot 120 to receive information. As used in this disclosure, a "pilot datum" is an element of information received from a pilot 120. Pilot inputs 124 may include a hover and thrust control assembly, a vertical propulsor, a forward propulsor, a throttle lever, a rotating throttle lever, a linear thrust control, a battery shut-off switch, a control stick, an inceptor stick, a collective pitch control, a steering wheel, brake pedals, pedal controls, toggles, and a joystick. Pilot inputs 124 may be consistent with disclosure of inputs in U.S. patent application Ser. No. 17/001,845 and titled "A HOVER AND THRUST CONTROL ASSEMBLY FOR DUAL-MODE AIRCRAFT," which is incorporated herein in its entirety by reference. Pilot inputs 124 may receive input from pilot 120 through standard I/O interface such as ISA (Industry Standard Architecture), PCI (Peripheral Component Interconnect) Bus, and the like. Pilot inputs 124 may receive input from user through standard I/O operation. In one embodiment, pilot inputs 124 may further receive input from pilot 120 through optical tracking of motion. In one embodiment, pilot inputs 124 may further receive input from pilot 120 through voice-commands. Pilot inputs 124 may further use event-driven programming, where event listeners are used to detect input from pilot 120 and trigger actions based on the input.

Still referring to FIG. 1, fuselage 104 may include avionics. Fuselage 104 may include, for example, sensors such as battery failure indicators, an angular position sensor, a hall effect sensor, and a contactless sensor. In some embodiments, fuselage 104 may include a graphical user interface (GUI) displayed on one or more screens in cockpit 112. As an example, and without limitation, GUI may be displayed on any electronic device, as described herein, such as, without limitation, a computer, tablet, remote device, and/or any other visual display device. GUI may be configured to present, to pilot 120, information related to the flight plan. In one embodiment, the one or more screens may be multi-function displays (MFD). As an alternative to the screens or in conjunction with the screens, fuselage 104 may include a primary display, gauges, graphs, audio cues, visual cues, information on a heads-up display (HUD) or a combination thereof. The display may include a display disposed in one or more areas of an aircraft, one or more computing devices, or a combination thereof.

Still referring to FIG. 1, system 100 includes a concave screen 128 facing the fuselage 104. Concave screen 128 is illustrated in FIG. 1 as partially cut away to clearly show the rest of system 100. Concave screen 128 may be configured to provide a wide field of vision to users for a immersive experience including a field of vision of, for example and within limitation, 200 degrees by 85 degrees, 220 degrees by 90 degrees, or any other view. Concave screen 128 may be concave with respect to a horizontal axis and/or the concave screen 128 may be concave with respect to a vertical axis. Concave screen 128 may be substantially spherical, meaning the concave screen 128 may be shaped as a section of a substantially spherical shell. Projectors 132 are directed at concave screen 128 and the projectors 132 are each configured to project an image onto the concave screen 128. As used in this disclosure, the term "directed at" is defined as positioned in relation to concave screen 128 to project onto the concave screen 128. Projectors 132 may make use of reflective waveguides, diffractive waveguides, lenses, or the like to transmit, project, and/or display images. For instance, and without limitation, projectors 132 may project images through and/or reflect images off an eyeglass-like structure and/or lens piece, where either both field of vision and images from projectors 132 may be so displayed, or the former may be permitted to pass through a transparent surface. Projectors 132 may be incorporated in a contact lens or eye tap device, which may introduce images into light entering an eye to cause display of such images. Projectors 132 may display some images using a virtual retina display (VRD), which may display an image directly on a retina of pilot 120. In some embodiments, one or more screens may be positioned where windows in a cockpit would normally be located in an operable eVTOL aircraft to give the realistic appearance to pilot 120 of operating an eVTOL aircraft.

Still referring to FIG. 1, an augmented reality device may be implemented in any suitable way, including without limitation incorporation of or in a head mounted display, a head-up display, a display incorporated in eyeglasses, googles, headsets, helmet display systems, or the like, a display incorporated in contact lenses, an eye tap display system including without limitation a laser eye tap device, VRD, or the like. Persons skilled in the art, upon reviewing the entirety of this disclosure, will be aware of various optical projection and/or display technologies that may be incorporated in augmented reality device consistently with this disclosure.

Further referring to FIG. 1, projectors 132 and/or other display devices incorporated in augmented reality device may implement a stereoscopic display. A "stereoscopic display," as used in this disclosure, is a display that simulates a user experience of viewing a three-dimensional space and/or object, for instance by simulating and/or replicating different perspectives of a user's two eyes; this is in contrast to a two-dimensional image, in which images presented to each eye are substantially identical, such as may occur when viewing a flat screen display. Stereoscopic display may display two flat images having different perspectives, each to only one eye, which may simulate the appearance of an object or space as seen from the perspective of that eye. Alternatively or additionally, stereoscopic display may include a three-dimensional display such as a holographic display or the like. Persons skilled in the art, upon reviewing the entirety of this disclosure, will be aware of various alternative or additional types of stereoscopic display that may be employed in an augmented reality device.

Still referring to FIG. 1, projectors 132 may include a first group of projectors 132 and a second group of projectors 132, wherein the first group of the projectors 132 is angled downward at concave screen 128. As used in this disclosure, "angled downward" means that a central axis drawn from a center of an output aperture of a projector to a center of a region illuminated thereby on a screen will have a negative slope when proceeding from the projector to the screen; for instance, projectors 132 that are angled downward may be positioned level with or above the horizontal axis of screen 128 and a central axis of each of the projectors 132 intersects concave screen 128 below the horizontal axis of concave screen 128. First group of projectors 132 may be positioned above fuselage 104. First group of projectors 132 may be angled downward at approximately the same angle relative to the vertical axis of concave screen 128. First group of projectors 132 may be equally spaced from neighboring projectors 132 of first group of projectors 132 with an equal horizontal angle between them. Second group of projectors 132 may level. As used in this disclosure, "level" means the projectors 132 are oriented horizontally such that a central axis of each of the projectors 132 is substantially perpendicular to the vertical axis of concave screen 128. Second group of projectors 132 may be positioned above fuselage 104. In some embodiments, second group of projectors 132 may be oriented such that the central axis of each of the projectors 132 intersects concave screen 128 above the horizontal axis of concave screen 128. Second group of projectors 132 may be equally spaced from neighboring projectors 132 of second group of projectors 132.

In some embodiments and as shown in FIG. 1, system 100 may comprise six projectors 132, wherein three projectors 132 are included in first group of projectors 132 and three projectors 132 are included in second group of projectors 132. First group of projectors 132 and second group of projectors 132 may each include various numbers of projectors 132, such as one, two, three, four, or more. The number of projectors 132 in first group of projectors 132 may differ from the number of projectors 132 in second group of projectors 132. Projectors 132 may be configured to each project a distinct image. Projectors 132 may be oriented such that each of the images projected from the projectors 132 at least partially overlaps another projected image. Projectors 132 may be attached to or otherwise on fuselage 104 or the projectors 132 may be attached to an independent supportive structure such as scaffolding 136.

System 100 includes a computing device 140 communicatively connected to projectors 132. As used in this disclosure, "communicatively connected" is defined as a process whereby one device, component, or circuit is able to receive data from and/or transmit data to another device, component, or circuit; communicative connecting may be performed by wired or wireless electronic communication, either directly or by way of one or more intervening devices or components. In an embodiment, communicative connecting includes electrically coupling an output of one device, component, or circuit to an input of another device, component, or circuit. Computing device 140 may include any computing device as described in this disclosure, including without limitation a microcontroller, microprocessor, digital signal processor (DSP) and/or system on a chip (SoC) as described in this disclosure. Computing device 140 may include, be included in, and/or communicate with a mobile device such as a mobile telephone or smartphone. Computing device 140 may include a single computing device operating independently, or may include two or more computing device operating in concert, in parallel, sequentially or the like; two or more computing devices may be included together in a single computing device or in two or more computing devices. Computing device 140 may interface or communicate with one or more additional devices as described below in further detail via a network interface device. Network interface device may be utilized for connecting computing device 140 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices 140, and any combinations thereof. A network may employ a wired and/or a wireless mode of communication. In general, any network topology may be used. Information (e.g., data, software etc.) may be communicated to and/or from a computer and/or a computing device 140. Computing device 140 may include but is not limited to, for example, a computing device or cluster of computing devices in a first location and a second computing device or cluster of computing devices in a second location. Computing device 140 may include one or more computing devices dedicated to data storage, security, distribution of traffic for load balancing, and the like. Computing device 140 may distribute one or more computing tasks as described below across a plurality of computing devices of computing device, which may operate in parallel, in series, redundantly, or in any other manner used for distribution of tasks or memory between computing devices. Computing device 140 may be implemented using a "shared nothing" architecture in which data is cached at the worker, in an embodiment, this may enable scalability of system 100 and/or computing device.

Still referring to FIG. 1, computing device 140 may be configured to operate a flight simulator. As used in this disclosure, a "flight simulator" is a program or set of operations that simulate flight. In some cases, a flight simulator may simulate flight within an environment, for example an environmental atmosphere in which aircraft fly, airports at which aircraft take-off and land, and/or mountains and other hazards aircraft attempt to avoid crashing into. In some cases, an environment may include geographical, atmospheric, and/or biological features. In some cases, a flight simulator may model an artificial and/or virtual aircraft in flight as well as an environment in which the artificial and/or virtual aircraft flies. In some cases, a flight simulator may include one or more physics models, which represent analytically or through data-based, such as without limitation machine-learning processes, physical phenomenon. Physical phenomenon may be associated with an aircraft and/or an environment. For example, some versions of a flight simulator may include thermal models representing aircraft components by way of thermal modeling. Thermal modeling techniques may, in some cases, include analytical representation of one or more of convective hear transfer (for example by way of Newton's Law of Cooling), conductive heat transfer (for example by way of Fourier conduction), radiative heat transfer, and/or advective heat transfer. In some cases, flight simulator may include models representing fluid dynamics. For example, in some embodiments, flight simulator may include a representation of turbulence, wind shear, air density, cloud, precipitation, and the like. In some embodiments, flight simulator may include at least a model representing optical phenomenon. For example, flight simulator may include optical models representative of transmission, reflectance, occlusion, absorption, attenuation, and scatter. Flight simulator may include non-analytical modeling methods; for example, the flight simulator may include, without limitation, a Monte Carlo model for simulating optical scatter within a turbid medium, for example clouds. In some embodiments, a flight simulator may represent Newtonian physics, for example motion, pressures, forces, moments, and the like. For instance and without limitation, the flight simulator may be consistent with the flight simulator in U.S. patent application Ser. No. 17/348,916 filed Jun. 16, 2021 and titled "METHODS AND SYSTEMS FOR SIMULATED OPERATION OF AN ELECTRIC VERTICAL TAKE-OFF AND LANDING (EVTOL) AIRCRAFT," which is incorporated herein by reference in its entirety. Flight simulation may be accomplished, without limitation, as discussed further below.

Still referring to FIG. 1, computing device 140 is configured to receive pilot datum detected by pilot inputs 124, generate a simulated eVTOL flight maneuver as a function of pilot datum, and command plurality of projectors 132 to display one or more images based on simulated eVTOL flight maneuver. As used in this disclosure, a "flight maneuver" is a movement or series of moves performed by an aircraft during commencement, operation, and/or termination of flight. A flight maneuver may include takeoff, landing, stability control maneuvers, emergency response maneuvers, regulation of altitude, roll, pitch, yaw, speed, acceleration, or the like during any phase of flight. A flight maneuver may include a flight plan or sequence of maneuvers to be performed during a flight plan. With continued reference to FIG. 1, system 100 may include a controller, such as a flight controller, which is discussed in detail below.

With continued reference to FIG. 1, computing device 140 may command plurality of projectors 132 to each display an image distinct such that each projector of plurality of projectors 132 is configured to project an image that is different than the other images projected by the other projectors 132. One, some, or all of images may at least partially overlap one or more of the other images, which may ensure that the overall resulting image is continuous without gaps in it. At least partially overlapping images may also increase the resolution and quality of the overall resulting image displayed on the concave screen 128. System 100 may include speakers communicatively connected to computing device 140 for a further immersive experience, wherein the speakers provide audible environmental sounds for a further immersive experience. Speakers may provide surround sound to allow pilot 120 to identify the direction from which distinct noises are emanating. System 100 may include a full motion system to move and vibrate cockpit 112 or chair or entire fuselage 104. Movement may include lateral and rotational movement.

With continued reference to FIG. 1, computing device 140 may be designed and/or configured to perform any method, method step, or sequence of method steps in any embodiment described in this disclosure, in any order and with any degree of repetition. For instance, computing device 140 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 140 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 2:
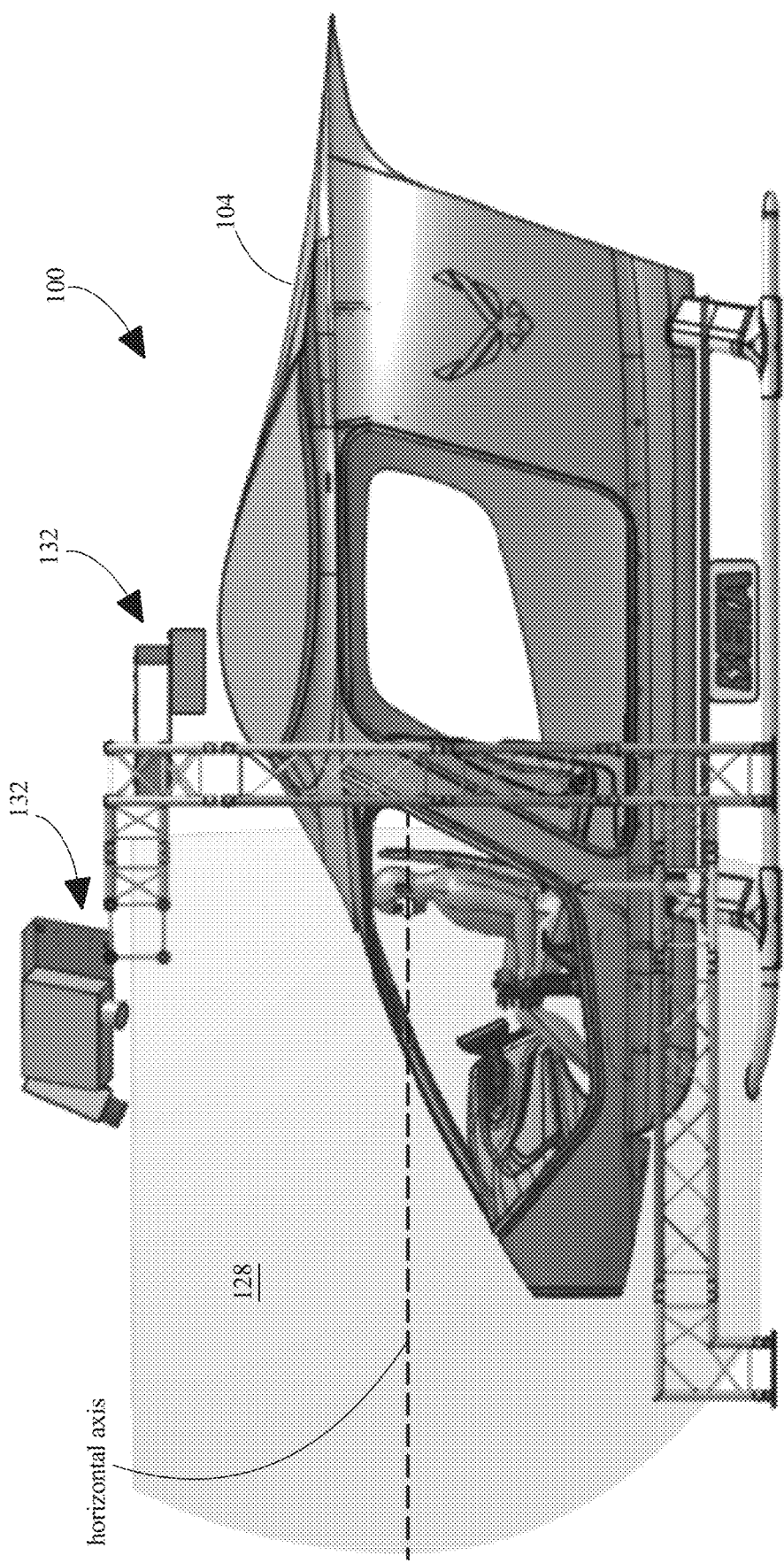
FIG. 2 is a side view of the system for simulating an eVTOL aircraft illustrated in FIG. 1 according to an embodiment of the disclosure.

FIG. 2 illustrates system 100, comprising projectors 132 directed at concave screen 128 that is facing fuselage 104. Also shown in FIG. 2 is the horizontal axis of concave screen 208 depicting projectors 132 above the horizontal axis of the concave screen 128. As illustrated, some of projectors 132 are level and other projectors 132 are angled downward at concave screen 128. Also shown in FIG. 2 is the horizontal axis of concave screen 128 is substantially eye level of pilot 120. In some embodiments, the height of the horizontal axis of concave screen can be above or below the eye level of pilot 120.

Figure 3:
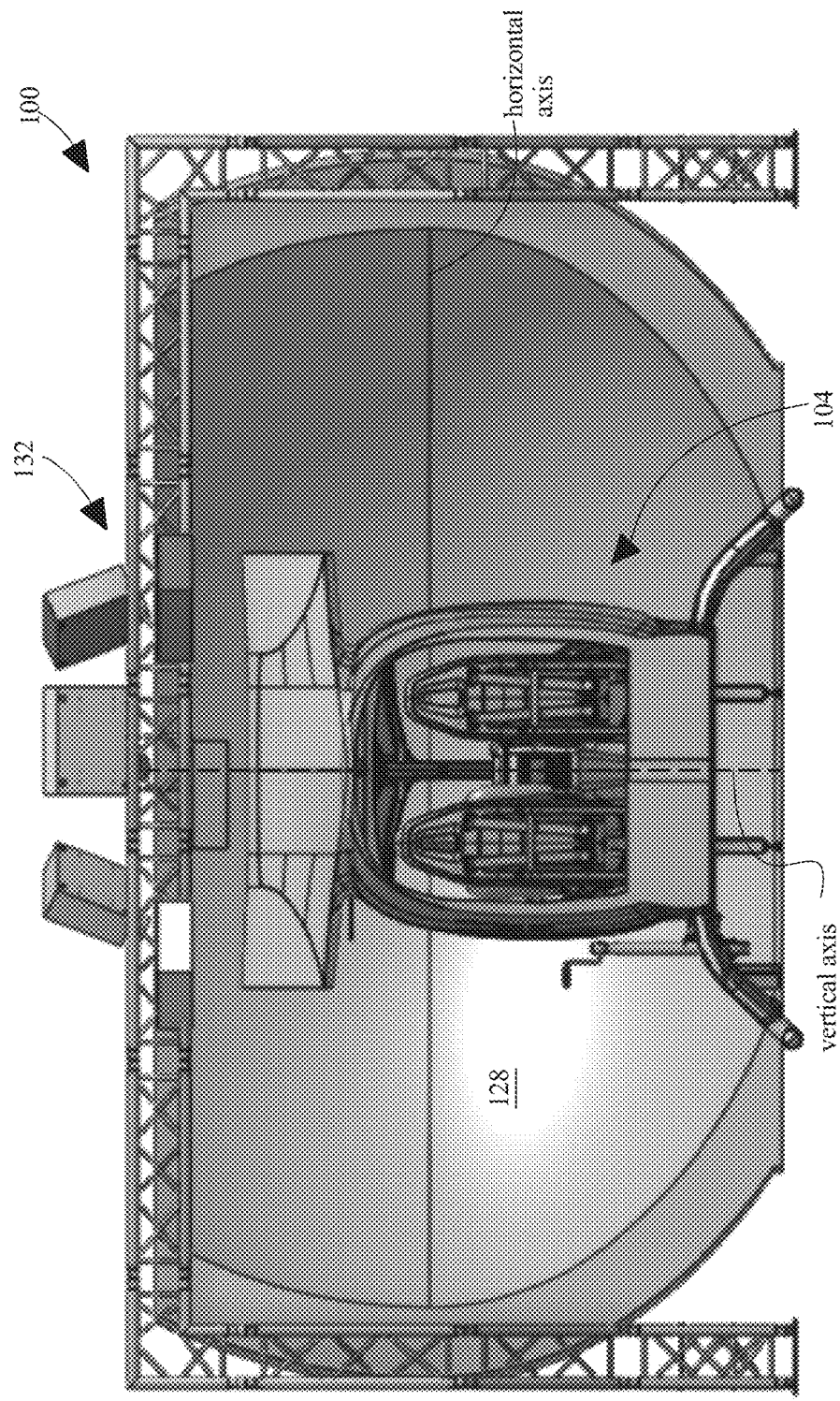
FIG. 3 is a rear view of the system for simulating an eVTOL aircraft illustrated in FIG. 1 according to an embodiment of the disclosure.

FIG. 3 shows system 100, comprising projectors 132 directed at concave screen 128 that is facing fuselage 104. Also shown in FIG. 3 are the vertical axis and horizontal axis of concave screen 308. As shown from the rear view of the system depicted in FIG. 3, fuselage 104 and cockpit 112 are positioned in front of the center of concave screen 128 such that the intersection of the horizontal axis and vertical axis of the concave screen 128 is approximately directly in pilot's line of vision.

Figure 4:
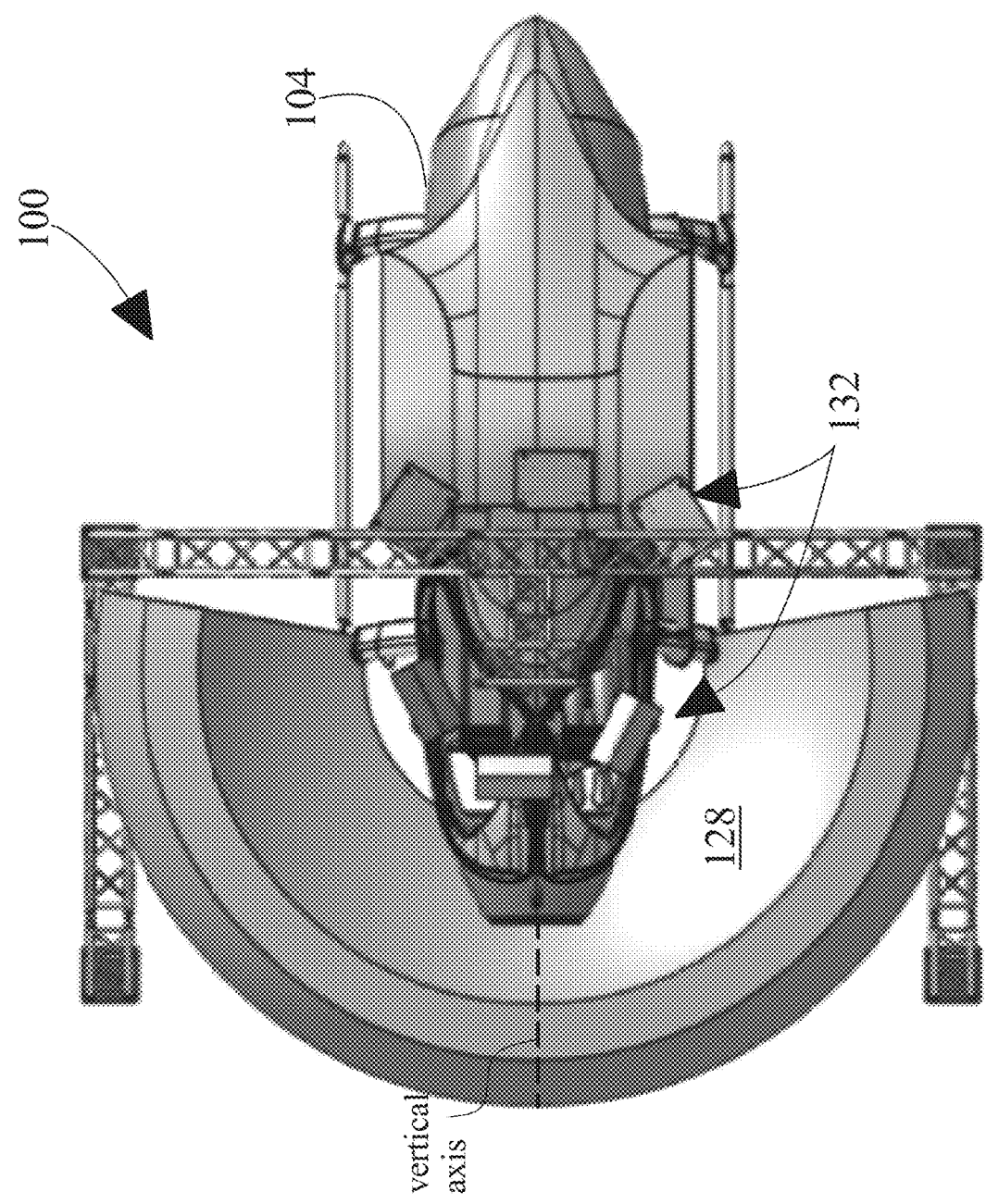
FIG. 4 is a top view of the system for simulating an eVTOL aircraft illustrated in FIG. 1 according to an embodiment of the disclosure.

FIG. 4 shows system 100, comprising projectors 404 directed at a concave screen 408 that is facing a fuselage 104. In some embodiments, projectors 132 are positioned directly above cockpit 112. In some embodiments, projectors 132 that are angled downward are positioned between the center of concave screen 128 defined by the intersection of the horizontal and vertical axis of the concave screen, as shown in FIG. 3, and the other projectors 132.

Figure 5:
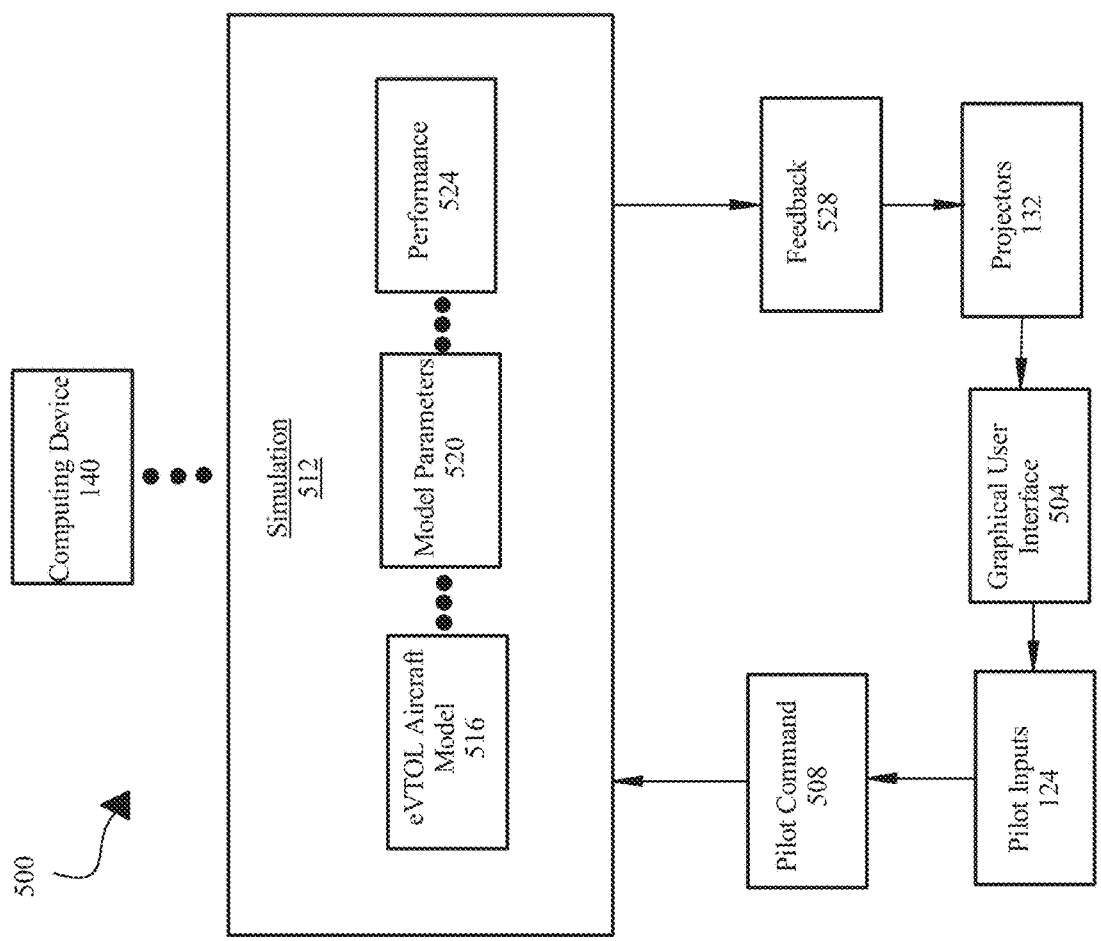
FIG. 5 is a block diagram illustrating an exemplary embodiment of a system for flight simulation of an eVTOL aircraft.

Referring to FIG. 5, an exemplary embodiment of a block diagram of system 500 for flight simulation is illustrated. System 500 may include, be included in, and/or be any system 100 as described above in reference to FIGS. 1-4. System 500 may include a graphical user interface (GUI) 504 displayed on one or more screens in conjunction with displays, which may include any displays as described above, including without limitation a concave screen 128 and projectors 132 and will inclusively be referred to as projectors 132. In some embodiments, GUI 504 may be configured to display a simulated cockpit of an electric aircraft. In other embodiments, GUI 504 may be configured to display visual indicators that may be used with real electric aircraft, such as but not limited to, altitude, wind speed, aircraft speed, roll, yaw, pitch, flight component status, torque of a flight component, temperature of a battery, power output of a battery, remaining battery charge, battery health, and/or fuel supply. GUI 504 may display a flight plan in graphical form. Graphical form may include a two-dimensional plot of two variables that represent data received by the controller, such as past maneuvers and predicted future maneuvers. In one embodiment, GUI 504 may also display a user's input in real-time. GUI 504 may be configured to show a primary flight display. The primary flight display may include an airspeed indicator, altitude indicator, slip skid indicator, altimeter, vertical speed indicator (VSI), turn indicator, horizontal situation indicator, and/or a turn rate indicator. In some embodiments, the primary flight display may include a general cruising speed, a ground airspeed, a flap range, a best angle of climb speed, a rotation speed and/or a best rate of climb speed. The primary flight display may include a transponder code, air temperature, waypoint, distance to waypoint, time and/or compass. In some embodiments, GUI 504 may display a flight maneuver that was just performed by pilot 120, a suggested maneuver to be performed, and a maneuver being currently performed by the pilot 120. In some embodiments, GUI 504 may display a different suggested maneuver upon deviation by the user from flight plan. In a nonlimiting example, GUI 504 may display different color schemes for immediate past maneuver, suggested immediate future maneuver, and a maneuver being currently performed. In one embodiment, additionally to the flight plan, GUI 504 may display an objective and a directional line once objective is nearby. In one embodiment, GUI 504 may display a directional path to the objective when the flight plan is set for an intermediate objective. In a nonlimiting example, GUI 504 may display a dotted path additionally to the suggested maneuvers and a graphical representation of the objective one user gets near the objective as to assist user when landing or reaching objective. In another nonlimiting example, GUI 504 may display a dotted line connected to the final objective as to keep user informed of direction of final objective when flight plan is set for an intermediate objective.

Still referring to FIG. 5, in some embodiments, GUI 504 may display a warning symbol to pilot 120. The warning symbol may include an abbreviation, a sign, or combination thereof. The warning symbol may highlight itself in blinking form, different colors, or combination thereof. Examples of warning symbols may indicate, but not limited to, a malfunction or failure of at least a flight component, flight controller, unfavorable landing location, and the like. The warning symbol or plurality of warning symbols may dissuade the pilot from undertaking a disadvantageous action. Examples of disadvantageous actions include, but not limited to, at least actions that may harm the VTOL aircraft or flight components, actions that may hard the pilot, actions that may produce collateral damage, and the like. Pilot inputs 104 may be configured to transform an input of a user into a pilot command 508. Pilot command 508 may include a desired torque applied to one or more propulsors based on a user input. Pilot command 508 may include data about torque, power, direction, acceleration and/or deceleration.

With continued reference to FIG. 5, pilot command 508 may be configured to be sent to computing device 140. Computing device 140 may be configured to generate a simulation 512. For example, and without limitation, computing device 140 may include one or more devices capable of modeling, simulating, analyzing, and the like thereof a multidomain system. Computing device 140 may be configured to generate an eVTOL aircraft model 516. As used in this disclosure a "model" is a representation and/or graphical image denoting an artificial and/or virtual aircraft in flight. In an embodiment, and without limitation, eVTOL aircraft model 516 may denote an environment in which the artificial and/or virtual aircraft flies. In some cases, eVTOL aircraft model 516 may include one or more physics models, which represent analytically or through data-based, such as without limitation machine-learning processes, one or more physical phenomena. One or more physical phenomena may be associated with an aircraft and/or an environment. For example, some versions of eVTOL aircraft model 516 may include thermal models representing aircraft components by way of thermal modeling. Additionally or alternatively, eVTOL model 516 may include one or more aerodynamics models, inertial models, mass models, propeller models, pusher motor models, Euler models, sensor models, battery models, and the like thereof. In an embodiment, and without limitation, sensor models may denote one or more representations of injecting noise, failed sensors, white noise potential, transfer functions, and the like thereof. In another embodiment, battery models may denote one or more estimation algorithms, power capabilities, thermal outputs, power capabilities, and the like thereof. In another embodiment, eVTOL model 516 may include a simple path and/or a variant path. As used in this disclosure a "simple path" is a less complex algorithm that allows for a faster simulation. In an embodiment, and without limitation, simple path may denote a fast simulation, wherein the enhanced speed reduces the accuracy of eVTOL aircraft model 516. As used in this disclosure a "variant path" is a more complex algorithm that allows for a slower simulation. In an embodiment, and without limitation, variant path may denote a slow simulation, wherein the reduced speed enhances the accuracy of eVTOL model 516.

Still referring to FIG. 5, in some embodiments, eVTOL aircraft model 516 may be configured to generate a model torque datum including a model torque datum threshold. A "model torque datum", for the purposes of this disclosure, is an element of data that represents an ideal torque output form an ideal propulsor model. One of ordinary skill in the art, after reviewing the entirety of this disclosure, would appreciate that model torque datum is the torque output an ideal virtual torque data from a perfect propulsor given performance parameter of a plurality of performance parameters. For example, in a nonlimiting embodiment, the propulsor model may include a performance parameter including air density, propulsor type, electrical input, and rpm. The model torque datum may be generated by to represent what a perfect (ideal) propulsor would output as torque given the performance parameters. The model torque datum threshold may include a range of acceptable torque values associated with the model torque datum. The model torque datum threshold may include a minimum and maximum torque value associated with the model torque datum. Simulation 512 may be configured to detect if the output torque datum is outside the model torque datum threshold, which may then trigger detection of datums consistent with this disclosure.

Still referring to FIG. 5, simulation 512 may be configured to generate a flight component of an eVTOL aircraft. A "model," as used in this disclosure, is a data structure and/or program that can simulate one or more relevant aspects of an object or device such as a flight component; one or more relevant aspects may include one or more behaviors affecting a designed use of the flight component to aid in flying and/or navigation of an aircraft. As used in this disclosure a "flight component" is a portion of an aircraft that can be moved or adjusted to affect one or more flight elements. For example, a flight component may include a component used to affect the aircrafts' roll and pitch which may comprise one or more ailerons. As a further example, a flight component may include a rudder to control yaw of an aircraft. In some embodiments, eVTOL aircraft model 516 may include a propulsor model. The propulsor model may include a set of data corresponding to a virtual propulsor's torque output. The propulsor model may include a computer program or computer application that represents propulsor torque performance given a certain set of conditions. This set of conditions may include a performance parameter. The performance parameters may include environmental parameters such as air density, air speed, true airspeed, relative airspeed, temperature, humidity level, and weather conditions, among others. The performance parameter may include propulsor parameters that define a propulsors physical characteristics and/or specifications such as material properties, electrical characteristics, propulsor type, weight, geometry, speed, and revolutions per minute (rpm), among others. The performance parameter may include velocity and/or speed in a plurality of ranges and direction such as vertical speed, horizontal speed, changes in angle or rates of change in angles like pitch rate, roll rate, yaw rate, or a combination thereof, among others.

With continued reference to FIG. 5, eVTOL aircraft model 516 may be configured to include a torque percentage datum. A "torque percentage datum", for the purposes of this disclosure, is an element of data representing the actual torque produced by at least a propulsor compared to the modeled torque output of the same ideal propulsor given the same performance parameters. For example, in a nonlimiting embodiment, eVTOL aircraft model 516 may generate a torque percentage datum by dividing an output torque datum by the model torque datum. The torque percentage datum may represent the torque output of an actual propulsor versus the same propulsor in an ideal world, giving way to a percentage of ideal torque. The torque percentage datum may be represented as a fraction, percentage, decimal, or other mathematical representation of part of a whole. One of ordinary skill in the art, after reviewing the entirety of this disclosure would appreciate that there are virtually limitless visual, auditory, haptic or other types of representations that the torque percentage datum may take.

In some embodiments and still referring to FIG. 5, eVTOL aircraft model 516 may include a battery model. The battery model may include any model related to at least property, characteristic, or function of a battery located within aircraft. In some cases, the battery model may include a model of a battery controller, management, and/or monitoring system. Disclosure related to battery management for eVTOL aircraft may be found in patent application Ser. Nos. 17/108,798 and 17/111,002, entitled "PACK LEVEL BATTERY MANAGEMENT SYSTEM" and "ELECTRICAL DISTRIBUTION MONITORING SYSTEM FOR AN ELECTRIC AIRCRAFT," respectively, each of which is incorporated herein by reference in its entirety. In some cases, a battery model may include an electrochemical model of battery, which may be predictive of energy efficiencies and heat generation and transfer of at least a battery. In some cases, a battery model may be configured to predict battery lifetime, given known battery parameters, for example measured battery performance, temperature, utilization, and the like. A battery model may be configured to simulate a battery failure. As used in the current disclosure, a "battery failure" refers to a malfunction of a battery cell, which may be an electrochemical cell, that renders the cell inoperable for its designed function, namely providing electrical energy to at least a portion of an electric aircraft. Byproducts of battery failure may include gaseous discharge including oxygen, hydrogen, carbon dioxide, methane, carbon monoxide, a combination thereof, or another undisclosed gas, alone or in combination. A battery failure may additionally include any electrical anomalies associated with the battery. A battery failure may include events where voltage exceeds the upper and lower voltage threshold. Events where voltage exceeds the upper and lower voltage threshold may also be an indication of battery cell failure or other electrical anomalies that could lead to potentially dangerous situations for aircraft and personnel that may be present in or near its operation.

Still referring to FIG. 5, eVTOL aircraft model 516 may be configured to produce a simulation of at least a flight element of an electric aircraft. As used in this disclosure a "simulation" is an imitation of aircraft and/or flight of an aircraft. For example, and without limitation, simulation may denote at least a flight element of an electric aircraft, wherein a flight element is an element of datum denoting a relative status of aircraft. In an embodiment, and without limitation, a flight element may denote one or more torques, thrusts, airspeed velocities, forces, altitudes, groundspeed velocities, directions during flight, directions facing, forces, orientations, and the like thereof. In an embodiment, and without limitation, eVTOL aircraft model 516 may produce a simulation denoting one or more adjustments to an altitude as a function of an adjusted and/or shifted direction during flight. As a further non-limiting example, eVTOL aircraft model 516 may produce a simulation denoting one or more modifications to an airspeed velocity as a function of a changing and/or altered windspeed velocity. In an embodiment, and without limitation, eVTOL aircraft model 516 may be configured to include operational data of a flight component for a plurality of simulated conditions. As used in this disclosure "operational data" is information denoting one or more operational functions of a flight component. For example, and without limitation, operational data may denote one or more rotational speeds, torques, forces, rpms, and the like thereof. For example, and without limitation, operational data may denote that a propulsor is rotating at a speed of 800 rpms. As a further non-limiting example, operational data may denote that an aileron is angled at 3.3° upward. In an embodiment, and without limitation, operational data may denote one or more voltage levels, electromotive force, current levels, temperature, current speed of rotation, and the like thereof. In another embodiment, operational data may denote one or more electrical parameters of a flight component such as a voltage, current, and/or ohmic resistance of a flight component. As used in this disclosure a "simulated condition" is a condition and/or environment that is to be simulated for flight condition. For example, and without limitation, simulated conditions may include an environmental condition of a wind force and/or precipitation. As a further non-limiting example, simulated conditions may include one or more alterations and/or modifications of operational datum. Simulation 512 may include algorithms and/or machine learning models, systems, and any combination thereof found in the flight controller Computing device 140 may be configured to simulate an operation of an electric aircraft. The operation may include any step in a flight sequence. In some embodiments, the operation may include an initialization operation for preparing a flight of an electric aircraft. In some embodiments, the operation may include a takeoff operation. The takeoff operation may include procedures and steps that my correlate to an initial transition from a resting position to a hovering position. In some embodiments, the operation may include a cruising operation. The cruising operation may include procedures and that may correlate to transitioning an electric aircraft from a takeoff position to a cruising position. In some embodiments, the operation may include a landing operation. The landing operation may include procedures and steps that may correlate with landing an electric aircraft. In some embodiments, computing device 140 may be configured to simulate a virtual reality. In some embodiments, computing device 140 may be configured to simulate an augmented reality. In some embodiments, computing device 140 may be configured to simulate an eVTOL aircraft model 516. eVTOL aircraft model 516 may include may be configured to include a power system. The power system may include an electrical system that may include a battery pack. In some embodiments, eVTOL aircraft model 516 may include a flight system. The flight system may include one or more propulsors. The one or more propulsors may include vertical and horizontal propulsors. In some embodiments, the eVTOL aircraft model 516 may be configured to simulate a weight and dimension of a real electric aircraft. eVTOL aircraft model 516 may be configured to include a set of aerodynamics. The set of aerodynamics may include data about lift, thrust, air resistance, and other aerodynamic parameters. In some embodiments, eVTOL aircraft model 516 may be configured to include a plurality of battery packs, battery cells, and/or battery assemblies. Computing device 140 may be configured to generate model parameters 520. Model parameters 520 may include a plurality of parameters that may be applied to eVTOL aircraft model 516. Model parameters 520 may include, but are not limited to, weather, altitude, location, wind speed, aircraft weight, aircraft dimensions, fuel supply, aircraft health, propulsion systems, power systems, cargo status, and/or other parameters, alone or in combination. Computing device 140 may be configured to apply model parameters 520 to eVTOL aircraft model 516. In some embodiments, model parameters 520 may be configured to simulate a plurality of flight scenarios. The flight scenarios may be configured to correspond to a plurality of training courses for a user. In some embodiments, model parameters 520 may include a battery health and a battery charge status of eVTOL aircraft model 516. The battery health and batter charge status may include data about battery temperature, battery capacity, battery voltage, battery current, battery integrity, and/or a battery failure. In some embodiments, eVTOL aircraft model 516 may include thermal models for one or more propulsors of a propulsion system. In some embodiments, eVTOL aircraft model 516 may include a high voltage simulation. In some embodiments, eVTOL aircraft 516 may include a low voltage simulation.

Continuing to refer to FIG. 5, in some embodiments, computing device 140 may be configured to determine a performance 524 of eVTOL aircraft model 516. A "performance" as defined in this disclosure is the difference of an action relative to a desired goal or outcome of the action. Performance 524 may be determined from a plurality of factors. Performance 524 may be determined based on pilot command 508 such as pilot inputs 124. In some embodiments, performance 524 may be determined relative to model parameters 520. In some embodiments, performance 524 may be determined based on a set of goals of a training course included in model parameters 520. Performance 524 may include information about eVTOL aircraft model 516, such as health and fuel supply. In some embodiments performance 524 may be determined based on a time score. In some embodiments, performance 524 may be determined based on a flight path taken. In some embodiments, performance 524 may be determined based on a deviation from a desired flight path. In some embodiments, performance 524 may be determined based on fuel efficiency. In some embodiments, performance 524 may be determined based on a landing of eVTOL aircraft model 516. The landing may be scored based on a plurality of metrics. The landing may be scored based on descent speed. The landing may be scored based on landing accuracy in a landing zone. The landing may be scored based on power efficiency. In some embodiments, computing device 140 may be configured to transform performance 524 into a feedback 528. Feedback 528 may be configured to relay performance 524 data to a user. In some embodiments, feedback 528 may include a user score. In some embodiments, the user score may be determined by a plurality of factors. In some embodiments, feedback 528 may include a breakdown of areas of improvement based on performance 524. The areas of improvement may include power efficiency, flight path deviation, electric aircraft health and/or other metrics. In some embodiments, feedback 528 may be configured to be displayed on concave screen 128 and or the other display screens. In some embodiments, feedback 528 may be a real time feedback shown in pilot inputs 124. In some embodiments, feedback 528 may include suggestions for flight maneuvers. In some embodiments, feedback 528 may include an average score from a history of simulated flights. In some embodiments, feedback 528 may be shown relative to performance of other users. In some embodiments, feedback 528 may be shown relative to a goal of a training course. In some embodiments, feedback 528 may be configured to display a battery performance metric. The battery performance metric may include, but is not limited to, battery charge, battery health, battery temperature, and/or battery usage. In some embodiments, feedback 528 may be configured to suggest a better flight maneuver and/or path to preserve the battery of eVTOL aircraft model 516. In some embodiments, feedback 528 may be configured to take control of pilot inputs 124 to illustrate a better way of piloting an electric aircraft for a user. In some embodiments, feedback 528 may be an auditory stimulus. In some embodiments, the auditory stimulus may include alerts. The alerts may include, but are not limited to, altitude alerts, battery alerts, temperature alerts, speed alerts, propulsion system alerts, collision alerts, or other alerts, alone or in combination. In some embodiments, computing device 140 may be configured to send performance 524 and feedback 528 to an external computing device. In some embodiments, computing device 140 may retain a history of performance 524 for a plurality of users in a database.

Figure 6:
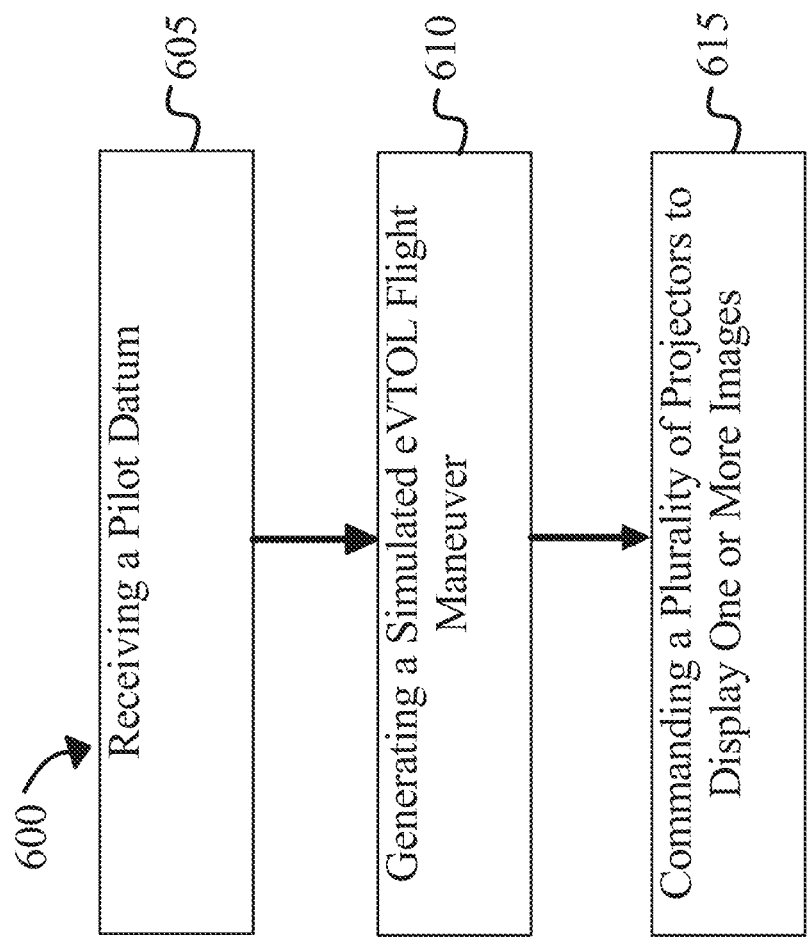
FIG. 6 is a flow diagram illustrating a method of simulating an eVTOL aircraft.

Referring now to FIG. 6, an exemplary embodiment of a method 600 of simulating an eVTOL aircraft is illustrated. At step 605, computing device, communicatively connected to a plurality of projectors directed at concave screen 128 and from plurality of pilot inputs 124 installed in fuselage 104, receives pilot datum; this may be implemented, without limitation, as described above in reference to FIGS. 1-6. Concave screen 128 may be substantially spherical. Plurality of projectors may comprise six projectors. Plurality of projectors may comprise first group of one or more projectors and second group of one or more projectors, wherein each projector in the first group of one or more projectors is angled downward at concave screen 128, and wherein each projector in the second group of one or more projectors is oriented horizontally. First and second groups of one or more projectors may each comprise three projectors. Central axis of each of second group of one or more projectors intersects concave screen 128 above horizontal axis of the concave screen 128. Receiving pilot datum may comprise receiving pilot datum from a collective pitch control. Receiving pilot datum may comprise receiving pilot datum from an inceptor stick.

At step 610, and still referring to FIG. 6, computing device generates simulated eVTOL flight maneuver as a function of the pilot datum; this may be implemented, without limitation, as described above in reference to FIGS. 1-6.

With continued reference to FIG. 6, at step 615, computing device commands plurality of projectors to display one or more images based on the simulated flight maneuver; this may be implemented, without limitation, as described above in reference to FIGS. 1-6. Commanding plurality of projectors may further comprise commanding each of the plurality of projectors to project a distinct image.

Figure 7:
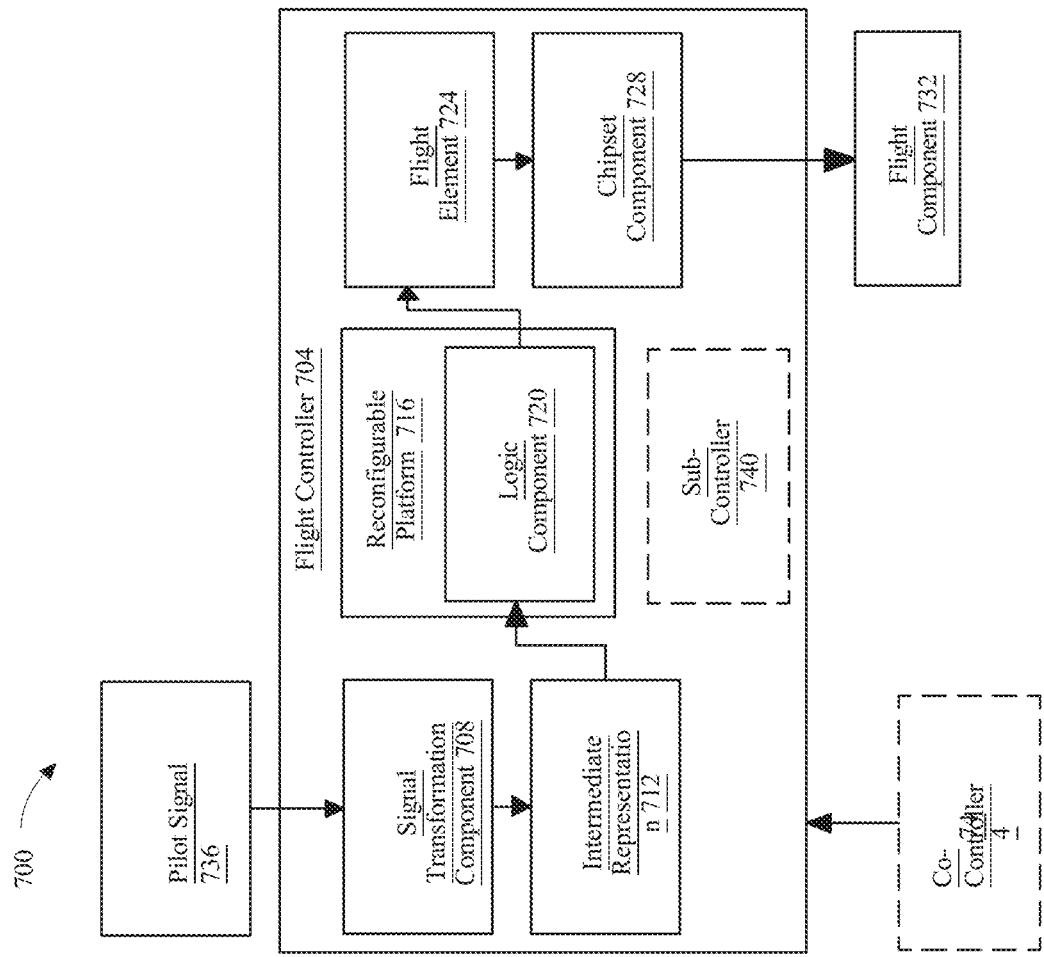
FIG. 7 is a block diagram of a flight controller according to an embodiment of the disclosure.

Now referring to FIG. 7, an exemplary embodiment 700 of a flight controller 704 is illustrated. Any or all routines, functions, or determinations implemented by a flight controller 704 may be used in a simulation system 100, 500 as described above. Any module of a flight controller 704 may be emulated, reproduced, and/or incorporated in a simulation system 100, 500 as described above. As used in this disclosure a "flight controller" is a computing device of a plurality of computing devices dedicated to data storage, security, distribution of traffic for load balancing, and flight instruction. Flight controller 704 may include and/or communicate with any computing device as described in this disclosure, including without limitation a microcontroller, microprocessor, digital signal processor (DSP) and/or system on a chip (SoC) as described in this disclosure. Further, flight controller 704 may include a single computing device operating independently, or may include two or more computing device operating in concert, in parallel, sequentially or the like; two or more computing devices may be included together in a single computing device or in two or more computing devices. In embodiments, flight controller 704 may be installed in an aircraft, may control the aircraft remotely, and/or may include an element installed in the aircraft and a remote element in communication therewith.

In an embodiment, and still referring to FIG. 7, flight controller 704 may include a signal transformation component 708. As used in this disclosure a "signal transformation component" is a component that transforms and/or converts a first signal to a second signal, wherein a signal may include one or more digital and/or analog signals. For example, and without limitation, signal transformation component 708 may be configured to perform one or more operations such as preprocessing, lexical analysis, parsing, semantic analysis, and the like thereof. In an embodiment, and without limitation, signal transformation component 708 may include one or more analog-to-digital convertors that transform a first signal of an analog signal to a second signal of a digital signal. For example, and without limitation, an analog-to-digital converter may convert an analog input signal to a 10-bit binary digital representation of that signal.

In another embodiment, signal transformation component 708 may include transforming one or more low-level languages such as, but not limited to, machine languages and/or assembly languages. For example, and without limitation, signal transformation component 708 may include transforming a binary language signal to an assembly language signal. In an embodiment, and without limitation, signal transformation component 708 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 7, signal transformation component 708 may be configured to optimize an intermediate representation 712. As used in this disclosure an "intermediate representation" is a data structure and/or code that represents the input signal. Signal transformation component 708 may optimize intermediate representation as a function of a data-flow analysis, dependence analysis, alias analysis, pointer analysis, escape analysis, and the like thereof. In an embodiment, and without limitation, signal transformation component 708 may optimize intermediate representation 712 as a function of one or more inline expansions, dead code eliminations, constant propagation, loop transformations, and/or automatic parallelization functions. In another embodiment, signal transformation component 708 may optimize intermediate representation as a function of a machine dependent optimization such as a peephole optimization, wherein a peephole optimization may rewrite short sequences of code into more efficient sequences of code. Signal transformation component 708 may optimize intermediate representation to generate an output language, wherein an "output language," as used herein, is the native machine language of flight controller 704. For example, and without limitation, native machine language may include one or more binary and/or numerical languages.

In an embodiment, and without limitation, signal transformation component 708 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 7, flight controller 704 may include a reconfigurable hardware platform 716. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 716 may be reconfigured to enact any algorithm and/or algorithm selection process received from another computing device and/or created using machine-learning processes.

Still referring to FIG. 7, reconfigurable hardware platform 716 may include a logic component 720. As used in this disclosure a "logic component" is a component that executes instructions on output language. For example, and without limitation, logic component may perform basic arithmetic, logic, controlling, input/output operations, and the like thereof. Logic component 720 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 720 may be organized according to Von Neumann and/or Harvard architecture as a non-limiting example. Logic component 720 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 720 may include one or more integrated circuit microprocessors, which may contain one or more central processing units, central processors, and/or main processors, on a single metal-oxide-semiconductor chip. Logic component 720 may be configured to execute a sequence of stored instructions to be performed on the output language and/or intermediate representation 712. Logic component 720 may be configured to fetch and/or retrieve the instruction from a memory cache, wherein a "memory cache," as used in this disclosure, is a stored instruction set on flight controller 704. Logic component 720 may be configured to decode the instruction retrieved from the memory cache to opcodes and/or operands. Logic component 720 may be configured to execute the instruction on intermediate representation 712 and/or output language. For example, and without limitation, logic component 720 may be configured to execute an addition operation on intermediate representation 712 and/or output language.

In an embodiment, and without limitation, logic component 720 may be configured to calculate a flight element 724. As used in this disclosure a "flight element" is an element of datum denoting a relative status of aircraft. For example, and without limitation, flight element 724 may denote one or more torques, thrusts, airspeed velocities, forces, altitudes, groundspeed velocities, directions during flight, directions facing, forces, orientations, and the like thereof. For example, and without limitation, flight element 724 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 724 may denote that aircraft is following a flight path accurately and/or sufficiently.

Still referring to FIG. 7, flight controller 704 may include a chipset component 728. As used in this disclosure a "chipset component" is a component that manages data flow. In an embodiment, and without limitation, chipset component 728 may include a northbridge data flow path, wherein the northbridge dataflow path may manage data flow from logic component 720 to a high-speed device and/or component, such as a RAM, graphics controller, and the like thereof. In another embodiment, and without limitation, chipset component 728 may include a southbridge data flow path, wherein the southbridge dataflow path may manage data flow from logic component 720 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 728 may manage data flow between logic component 720, memory cache, and a flight component 732. As used in this disclosure a "flight component" is a portion of an aircraft that can be moved or adjusted to affect one or more flight elements. For example, flight component 732 may include a component used to affect the aircrafts' roll and pitch which may comprise one or more ailerons. As a further example, flight component 732 may include a rudder to control yaw of an aircraft. In an embodiment, chipset component 728 may be configured to communicate with a plurality of flight components as a function of flight element 724. For example, and without limitation, chipset component 728 may transmit to an aircraft rotor to reduce torque of a first lift propulsor and increase the forward thrust produced by a pusher component to perform a flight maneuver.

In an embodiment, and still referring to FIG. 7, flight controller 704 may be configured generate an autonomous function. As used in this disclosure an "autonomous function" is a mode and/or function of flight controller 704 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 724. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 704 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 704 will control the ailerons and/or rudders. As used in this disclosure "non-autonomous mode" is a mode that denotes a pilot will control aircraft and/or maneuvers of aircraft in its entirety.

In an embodiment, and still referring to FIG. 7, flight controller 704 may generate autonomous function as a function of an autonomous machine-learning model. As used in this disclosure an "autonomous machine-learning model" is a machine-learning model to produce an autonomous function output given flight element 724 and a pilot signal 736 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 736 may denote that a pilot is controlling and/or maneuvering ailerons, wherein the pilot is not in control of the rudders and/or propulsors. In an embodiment, pilot signal 736 may include an implicit signal and/or an explicit signal. For example, and without limitation, pilot signal 736 may include an explicit signal, wherein the pilot explicitly states there is a lack of control and/or desire for autonomous function. As a further non-limiting example, pilot signal 736 may include an explicit signal directing flight controller 704 to control and/or maintain a portion of aircraft, a portion of the flight plan, the entire aircraft, and/or the entire flight plan. As a further non-limiting example, pilot signal 736 may include an implicit signal, wherein flight controller 704 detects a lack of control such as by a malfunction, torque alteration, flight path deviation, and the like thereof. In an embodiment, and without limitation, pilot signal 736 may include one or more explicit signals to reduce torque, and/or one or more implicit signals that torque may be reduced due to reduction of airspeed velocity. In an embodiment, and without limitation, pilot signal 736 may include one or more local and/or global signals. For example, and without limitation, pilot signal 736 may include a local signal that is transmitted by a pilot and/or crew member. As a further non-limiting example, pilot signal 736 may include a global signal that is transmitted by air traffic control and/or one or more remote users that are in communication with the pilot of aircraft. In an embodiment, pilot signal 736 may be received as a function of a tri-state bus and/or multiplexor that denotes an explicit pilot signal should be transmitted prior to any implicit or global pilot signal.

Still referring to FIG. 7, autonomous machine-learning model may include one or more autonomous machine-learning processes such as supervised, unsupervised, or reinforcement machine-learning processes that flight controller 704 and/or a remote device may or may not use in the generation of autonomous function. As used in this disclosure "remote device" is an external device to flight controller 704. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 7, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 704 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 7, flight controller 704 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 704. Remote device and/or FPGA may transmit a signal, bit, datum, or parameter to flight controller 704 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 704 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 7, flight controller 704 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 7, flight controller 704 may include, but is not limited to, for example, a cluster of flight controllers in a first location and a second flight controller or cluster of flight controllers in a second location. Flight controller 704 may include one or more flight controllers dedicated to data storage, security, distribution of traffic for load balancing, and the like. Flight controller 704 may be configured to distribute one or more computing tasks as described below across a plurality of flight controllers, which may operate in parallel, in series, redundantly, or in any other manner used for distribution of tasks or memory between computing devices. For example, and without limitation, flight controller 704 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 7, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 732. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 7, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 704. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 712 and/or output language from logic component 720, wherein output language may include one or more analog-to-digital conversions, low bit rate transmissions, message encryptions, digital signals, binary signals, logic signals, analog signals, and the like thereof described above in detail.

Still referring to FIG. 7, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 7, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 7, flight controller 704 may also be implemented using a "shared nothing" architecture in which data is cached at the worker, in an embodiment, this may enable scalability of aircraft and/or computing device. Flight controller 704 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 7, flight controller may include a sub-controller 740. As used in this disclosure a "sub-controller" is a controller and/or component that is part of a distributed controller as described above; for instance, flight controller 704 may be and/or include a distributed flight controller made up of one or more sub-controllers. For example, and without limitation, sub-controller 740 may include any controllers and/or components thereof that are similar to distributed flight controller and/or flight controller as described above. Sub-controller 740 may include any component of any flight controller as described above. Sub-controller 740 may be implemented in any manner suitable for implementation of a flight controller as described above. As a further non-limiting example, sub-controller 740 may include one or more processors, logic components and/or computing devices capable of receiving, processing, and/or transmitting data across the distributed flight controller as described above. As a further non-limiting example, sub-controller 740 may include a controller that receives a signal from a first flight controller and/or first distributed flight controller component and transmits the signal to a plurality of additional sub-controllers and/or flight components.

Still referring to FIG. 7, flight controller may include a co-controller 744. As used in this disclosure a "co-controller" is a controller and/or component that joins flight controller 704 as components and/or nodes of a distributer flight controller as described above. For example, and without limitation, co-controller 744 may include one or more controllers and/or components that are similar to flight controller 704. As a further non-limiting example, co-controller 744 may include any controller and/or component that joins flight controller 704 to distributer flight controller. As a further non-limiting example, co-controller 744 may include one or more processors, logic components and/or computing devices capable of receiving, processing, and/or transmitting data to and/or from flight controller 704 to distributed flight control system. Co-controller 744 may include any component of any flight controller as described above. Co-controller 744 may be implemented in any manner suitable for implementation of a flight controller as described above.

In an embodiment, and with continued reference to FIG. 7, flight controller 704 may be designed and/or configured to perform any method, method step, or sequence of method steps in any embodiment described in this disclosure, in any order and with any degree of repetition. For instance, flight controller 704 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device 140 include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device 140 may include and/or be included in a kiosk.

Figure 8:
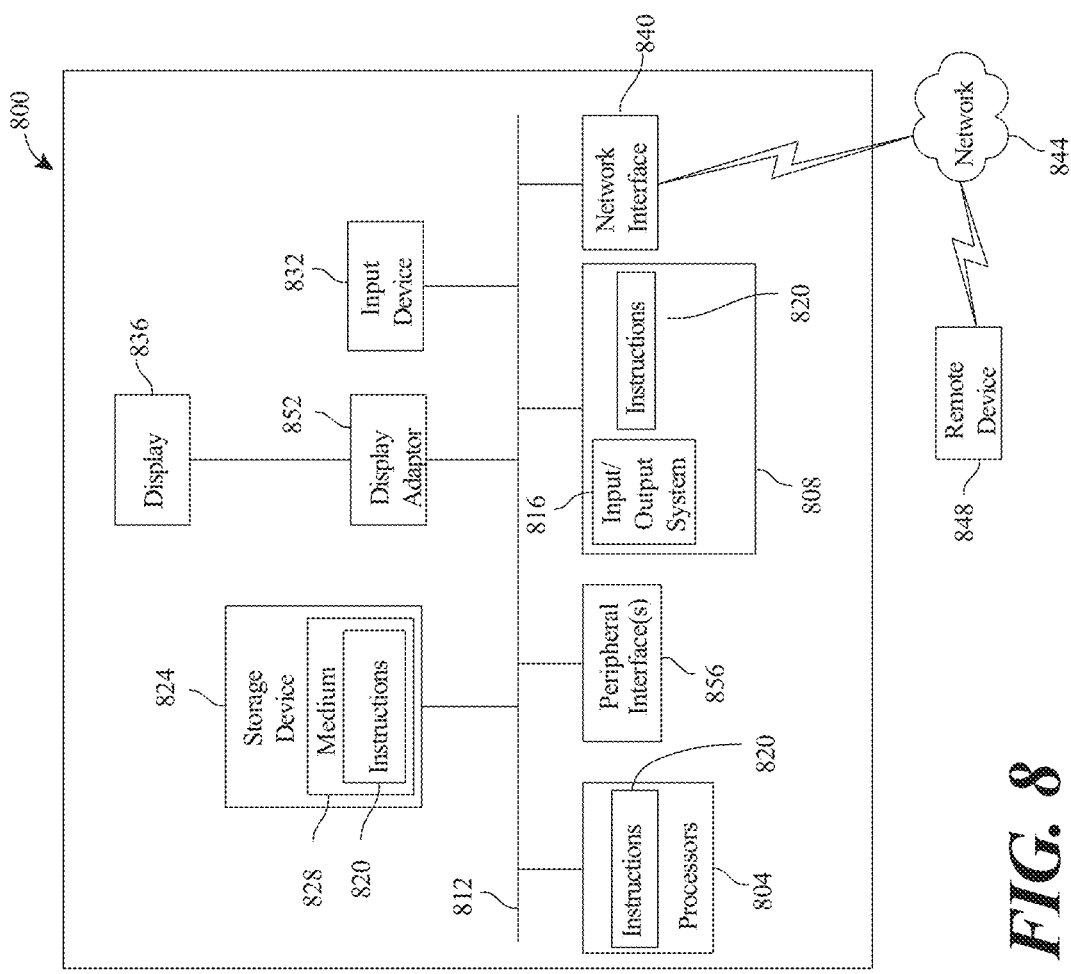
FIG. 8 is a block diagram of a computing system that can be used to implement any one or more of the methodologies disclosed herein and any one or more portions thereof.

FIG. 8 shows a diagrammatic representation of one embodiment of a computing device 140 in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the disclosure. Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this disclosure.

Exemplary embodiments have been disclosed above and illustrated in the accompanying drawings. It will be understood by those skilled in the art that various changes, omissions and additions may be made to that which is specifically disclosed herein without departing from the spirit and scope of the present disclosure.

What is claimed is:

1. A system for simulating an electrical aircraft, comprising:
   a fuselage including one or more pilot inputs, each of the pilot inputs configured to detect pilot data;
   a display screen; and
   a computing device communicatively connected to the display screen and the one or more pilot inputs, the computing device configured to:
      generate, using an electrical aircraft model representing the electrical aircraft, a simulated flight maneuver during a failure of a power system configured to power the electrical aircraft;
      command the display screen to display one or more images based on the simulated flight maneuver;
      receive the pilot data detected by the pilot inputs while a pilot engages in the simulated flight maneuver; and
      determine, based on the pilot data, a performance of the pilot as a function of an amount of energy consumed by the power system during the simulated flight maneuver.

2. The system of claim 1, wherein the electrical aircraft model comprises a model of the power system configured to power the electrical aircraft during flight.

3. The system of claim 2, wherein the electrical aircraft model is configured to simulate an energy efficiency of the power system, and wherein the performance of the pilot includes a measure of the energy efficiency of the power system determined according to the pilot data and the electrical aircraft model.

4. The system of claim 2, wherein the power system includes a battery configured to power the electrical aircraft the electrical aircraft.

5. The system of claim 4, wherein the electrical aircraft model is configured to simulate a temperature associated with the battery using a thermal model, a battery lifetime of the battery, or a performance of the battery.

6. The system of claim 1, wherein the electrical aircraft model is configured to simulate torque data of a propulsor of the electrical aircraft.

7. The system of claim 1, wherein the pilot inputs include a collective attitude control, an inceptor stick, a hover assembly, or a thrust control assembly.

8. The system of claim 1, wherein the simulated flight maneuver includes a transition between a hovering mode of the electrical aircraft and a cruising mode of the electrical aircraft.

9. The system of claim 8, wherein the computing device is further configured to:
   determine, based on the pilot data, the performance of the pilot as a function of an amount of energy consumed by the power system during the transition between the hovering mode of the electrical aircraft and the cruising mode of the electrical aircraft.

10. The system of claim 1, wherein the electrical aircraft is a vertical takeoff and landing (eVTOL) aircraft.

11. A method for implementing an aircraft simulation system, comprising:
    generating, using an electrical aircraft model representing an electrical aircraft, a simulated flight maneuver including a transition between a hovering mode of the electrical aircraft and a cruising mode of the electrical aircraft;
    commanding a display screen to display one or more images based on the simulated flight maneuver;
    receiving, from a plurality of pilot inputs installed in a fuselage, pilot data detected by the pilot inputs while a pilot engages in the simulated flight maneuver; and
    determining based on the pilot data, a performance of the pilot as a function of an amount of energy consumed by a power system during the transition between the hovering mode of the electrical aircraft and the cruising mode of the electrical aircraft, wherein the power system is configured to power the electrical aircraft.

12. The method of claim 11, wherein the electrical aircraft model comprises a model of the power system configured to power the electrical aircraft during flight.

13. The method of claim 12, wherein the electrical aircraft model is configured to simulate an energy efficiency of the power system, and wherein the performance of the pilot includes a measure of the energy efficiency of the power system during the transition between the hovering mode of the electrical aircraft and the cruising mode of the electrical aircraft determined according to the pilot data and the electrical aircraft model.

14. The method of claim 12, wherein the power system includes a battery configured to power the electrical aircraft the electrical aircraft.

15. The method of claim 14, wherein the electrical aircraft model is configured to simulate a temperature associated with the battery using a thermal model, a battery lifetime of the battery, or a performance of the battery.

16. The method of claim 11, wherein the electrical aircraft model is configured to simulate torque data of a propulsor of the electrical aircraft.

17. The method of claim 11, wherein the pilot inputs include a collective attitude control, an inceptor stick, a hover assembly, or a thrust control assembly.

18. The method of claim 11, wherein the simulated flight maneuver includes a failure of the power system configured to power the electrical aircraft.

19. The method of claim 18, further comprising:
   determining, based on the pilot data, the performance of the pilot as a function of an amount of energy consumed by a power system during the failure of the power system.

20. The method of claim 11, wherein the electrical aircraft is a vertical takeoff and landing (eVTOL) aircraft.

* * * * *